United States Patent Office 3,164,609
Patented Jan. 5, 1965

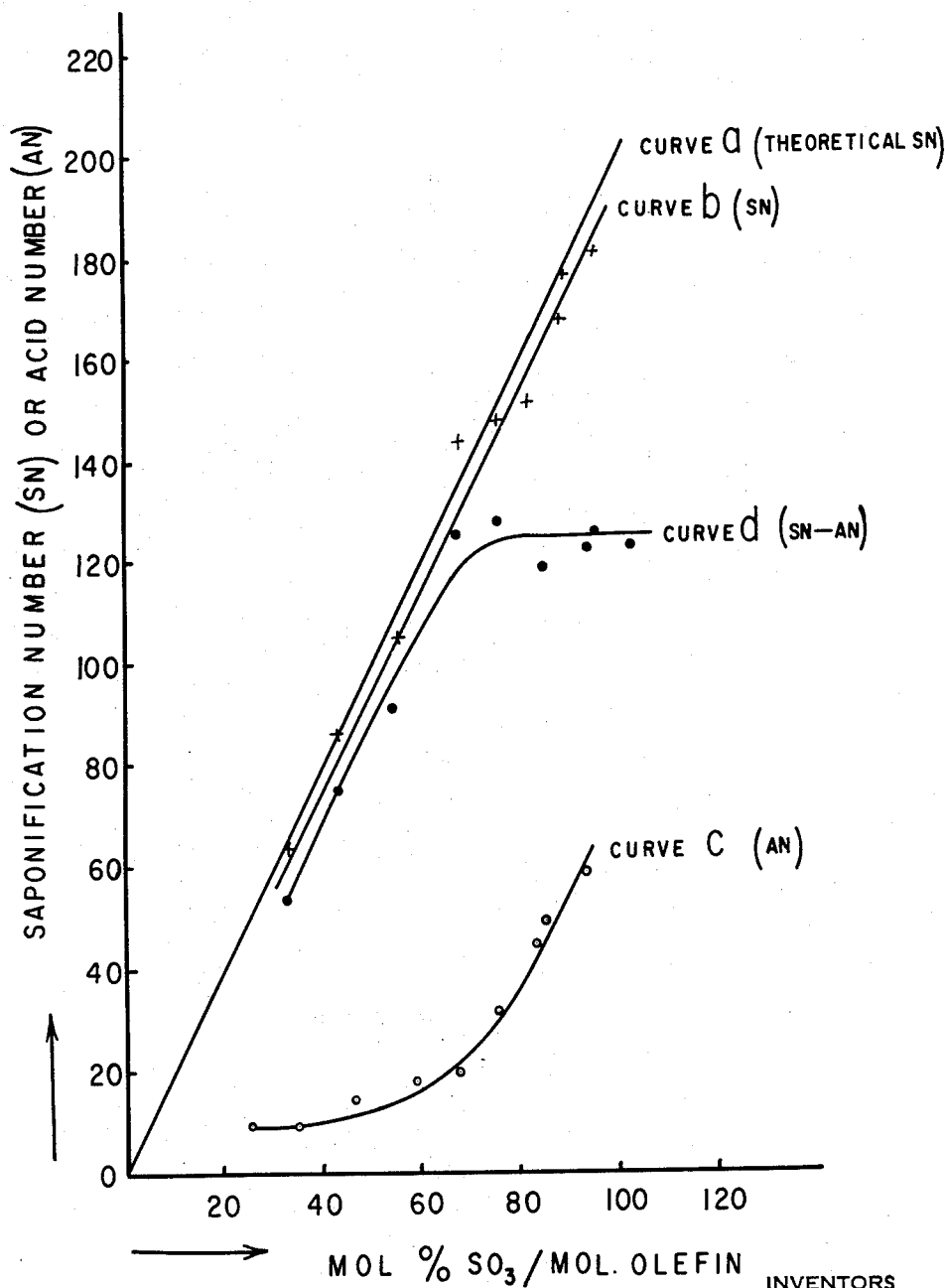

3,164,609
PROCESS FOR THE PREPARATION OF SULTONES
Manfred Voss and Horst Baumann, Hilden, Rhineland, and Werner Stein, Dusseldorf-Holthausen, Germany, assignors to Henkel & Cie. G.m.b.H., Dusseldorf-Holthausen, Germany, a corporation of Germany
Filed Dec. 5, 1962, Ser. No. 242,563
Claims priority, application Germany, Aug. 9, 1962,
H 46,593
10 Claims. (Cl. 260—327)

This invention relates to an improvement in the process of producing sultones which comprises reacting olefins with less than equimolar amounts of sulfur trioxide.

In co-pending, commonly-assigned United States patent application Serial No. 242,361, filed of even date, there is described a process for the preparation of sultones, which is characterized in that α-olefins, which are not branched in the β- or γ-position and which have the structural formula $$R_3R_2R_1C\text{—}CH_2\text{—}CH\text{=}CH_2$$

wherein $R_1$, $R_2$ and $R_3$ represent hydrogen or aliphatic hydrocarbon radicals, are reacted with sulfur trioxide. Thereafter, the sultone is recovered, preferably, either directly from the reaction product thus obtained by vacuum distillation, or the sulfonation product is first transformed by aqueous hydrolysis into a hydroxy sulfonic acid. The sultone is subsequently recovered from this hydroxy sulfonic acid by splitting off water at an elevated temperature under vacuum and/or by using an entrainment agent.

In this process the sulfur trioxide is used in an amount of about 1–3 mols per mol of olefin. It may be employed in the solid or gaseous state or in the form of a solution, such as in liquid $SO_2$, or in a suitable organic solvent. The gaseous sulfur trioxide is advantageously diluted with an inert gas, such as air or $SO_2$. The sulfur trioxide may also be employed in the form of its addition compounds, for instance with dioxane or pyridine.

It is an object of the present invention to obtain an improvement in the process of producing sultones by reaction of α-olefins with sulfur trioxide in less than equimolecular amounts.

Another object of the invention is the development of a process for the production of sultones which comprises the steps of reacting about one mol of an α-olefin having the formula $$R_3R_2R_1\text{—}C\text{—}CH_2\text{—}CH\text{=}CH_2$$

wherein $R_1$, $R_2$ and $R_3$ are selected from the group consisting of hydrogen and saturated aliphatic hydrocarbon radicals, said α-olefin having from 4 to 30 carbon atoms, with from 0.1 to 0.8 mol of sulfur trioxide at a temperature between about −30° C. and about 80° C., and recovering said sultones.

These and other objects of the invention will become more apparent as the description thereof proceeds.

It has now been found that the yield of sultone can be substantially improved, the amount of side products reduced and the process substantially simplified in many cases if one mol of olefin is reacted with less than one mol of sulfur trioxide, preferably from 0.1 to 0.8 mol of sulfur trioxide.

Upon detailed investigation of the reaction of α-olefins with $SO_3$, the surprising discovery was found that sultones are formed directly as primary products, whose amounts initially increase in the reaction mixture as a function of the amount of sulfur trioxide which is added. After achievement of an optimum, acid products are formed to an increasing degree upon further addition of $SO_3$ without an appreciable further increase in the amount of sultone which is formed. Upon addition of more than one mol of $SO_3$ per mol of olefin, the $SO_3$ reacts with the sultone previously found to form products some of which have an unknown structure and some of which can be regarded as carbylsulfate homologs. The amount of sultone produced thereby again decreases.

In the drawing, FIGURE 1 depicts the saponification and acid numbers of olefins sulfonated with varying amounts of sulfur trioxide.

These conditions are illustrated in the drawing. The starting material was a technical grade, substantially unbranched aliphatic olefin having a chain length of 14 carbon atoms. The reaction temperature was 10° C. The details of this run are described in Example 4. The abscissa of the graph of FIGURE 1 represents the amount of $SO_3$ added, based upon the amount of olefin used, in terms of mol-percent. The ordinate shows the saponification numbers and the acid numbers of the reaction mixture. First, curve $a$ shows the theoretical saponification numbers for the case of a 100% yield of sultone. Curve $b$ shows the saponification number actually obtained (in ethanol-water) and curve $c$ shows the acid number of the mixture. It can be clearly seen that the acid number initially is relatively low, but after addition of about 0.6 mol of $SO_3$ per mol of olefin, it increases considerably. Curve $d$ shows the difference between the saponification number and acid number (ester number). This curve provides a measure for the amount of sultone which is present in the reaction mixture. It may be clearly seen from this curve that a sharp bend occurs approximately simultaneously with the increase in the acid number and that the amount of sultone produced after addition of 0.7 mol of $SO_3$ per mol of olefin does not increase to a substantial degree any more.

While the position of the optimum sultone formation in relation to the ratio of olefin to $SO_3$ is somewhat different, depending upon the starting material and the reaction temperature, it has been found that it is in no case advantageous to employ more than 0.8 mol of $SO_3$ per mol of olefin. The lower limit for the amount of $SO_3$ to be employed lies, for practical reasons, at about 0.2 mol per mol of olefin. However, it is also possible to use less $SO_3$ and amounts down to 0.1 mol per mol of olefin may be employed. The separation of the reaction mixture, however, becomes uneconomical thereby. The yield of sultone based on the amount of $SO_3$ employed does not decrease, however.

The sulfur trioxide can be used in a solid or gaseous state or in the form of a solution, for instance in liquid $SO_2$ or in a suitable organic solvent, for the purpose of the process according to the present invention. Gaseous sulfur trioxide is advantageously diluted with an inert gas such as air, nitrogen or $SO_2$. The sulfur trioxide may also be employed in the form of its addition compounds, for instance with dioxane. It is preferred to use mixtures of $SO_3$ and air for the process of the present invention, whose content of $SO_3$ is advantageously about 3–15 volume-percent.

The process of the present invention is especially simple when, as explained further below, aliphatic olefins with more than 10 carbon atoms in the molecule are used as starting materials. Such aliphatic olefins are now accessible through a variety of industrial processes, for instance by cracking petroleum with certain catalysts, or by building them up from lower olefins, especially from ethylene. By means of the process according to the present invention, it is also possible to obtain sultones from relatively high molecule olefins, for instance with up to 20–30 carbon atoms. However, for manufacturing of surfactant substances and the like, sultones which contain no more than 20 carbon atoms are generally preferred.

The excess olefin which is not consumed in the reaction may easily be recovered, for instance by distillation in a thin-layer-evaporator, and may again be used as the starting material. In the event that olefins with more than 10 carbon atoms are used as the starting material, the sultone formed by the reaction begins to crystallize out, especially when relatively uniform starting olefins are used, after introducing as little as about 0.1-0.2 mol of $SO_3$ per mole of olefin, and may therefore be readily isolated. The amount of crystallized sultone present in the reaction mixture again decreases upon introducing more than one mol of $SO_3$ per mol of olefin because, as already mentioned, the $SO_3$ reacts with the sultone under these conditions. The process according to the present invention also offers advantages when aliphatic olefins with 10 carbon atoms or less are used, such as butene-1, hexene-1 and the like, because of the improvement in the yield of sultone. The separation of the reaction mixture is facilitated by virtue of the reduction of the amount of side products produced.

The reaction of the olefin with the sulfur trioxide is advantageously performed by introducing a mixture of sulfur trioxide and air having the above indicated composition into the olefin, accompanied by cooling, and a reaction temperature of about 70° C. being advantageously not exceeded. For short periods of time, however, temperatures of 80° C. or even higher may be employed. It has been found that the yield of sultones is better at low reaction temperatures, that is, the optimum shown in curves c and d of the diagram is displaced toward the right at lower reaction temperatures and toward the left at higher reaction temperatures. For this reason it is advantageous to perform the reaction at temperatures as low as possible, that is, about −10 to +40° C. Even lower temperatures, down to −30° C. may be employed, especially with the lower molecular weight olefins. However, at lower temperatures the reaction mixture tends to solidify in the event that olefins with longer chains are used as starting materials and the sultones formed thereby crystallize out. In these instances it is recommended either not to permit the temperature to drop too low or to dilute the reaction mixture with an inert solvent.

The reaction mixture may be worked up by various methods. For instance, volatile sultones with less than 10 carbon atoms, especially butane sultone, may be distilled directly out of the reaction mixture. After distilling off the excess olefin, the raw sulfonation mixture may also be subjected to hydrolysis, and subsequently water may be split off from the hydroxyalkane sulfonic acid formed by the reaction at elevated temperature either in vacuo, or by an entrainment agent and thereafter distilling off the sultone. This method has the advantage that a portion of the by-products which are produced are also transformed into hydroxalkane sulfonic acids which result in sultones upon distillation. The hydroxyalkane sulfonic acids which are formed by the hydrolysis may also be readily purified in the form of their salts, for instance their barium salts, so that fewer decomposition products are obtained on distillation of the sultone. The sultone may also be isolated by extraction.

In the event of sultones with more than 10 carbon atoms, the sultone crystallizes out of the reaction mixture as explained above. Under these circumstances, an isolation, for instance by filtration or by centrifugation, is especially simple. The sultones obtained in this manner can be further purified by recrystallization. It is not actually necessary to isolate the sultones prepared according to the process of the present invention in pure form. In many cases the raw reaction mixtures containing the sultones are entirely suitable for the production of sultone reaction products, possibly after separation of the excess olefin. The crystallizates obtained from olefins with more than 10 carbon atoms, in which the sultone is already present in relatively pure form, are especially suitable for the preparation of sultone reaction products. The same applies to the raw sultone which has been freed from excess olefin and high-boiling-point components with the aid of a thin-layer-evaporator, but which still contains acid compounds.

The following examples will further illustrate the present invention and enable others skilled in the art to understand the invention more completely. It is to be understood, however, that the following examples are not to be construed as limitations on the practice of the invention.

*Example 1*

The following run was performed in a cylindrical reaction vessel having a capacity of 600 cc., which was provided with a cooling jacket, gas feed line reaching to the bottom of the vessel, a thermometer, and a gas discharge line.

180 gm. of technical grade n-decene-1 (this product was obtained by cracking of petroleum paraffins, and, according to the manufacturer, contained 96-97% of α-olefins) were placed into the reaction vessel.

A mixture of $SO_3$ and air, containing 5% by volume of $SO_3$, was introduced over the course of 90 minutes, accompanied by cooling with ice water. During this time care was taken that the temperature did not exceed +8° C. After the weight of the reaction vessel had increased by 44 gm., the introduction of $SO_3$ was discontinued.

The reaction mixture thus obtained was distilled in a large, thin-layer-evaporator at a jacket temperature of 220-230° C. and a pressure of 1 mm. Hg, and was in this manner freed from high-boiling-point side products and from unreacted starting olefin. For further purification, the distillation in the thin-layer-evaporator was repeated. 108 gm. of raw sultone were obtained in this manner, which had a saponification number of 246 (theoretical saponification number 254). The product also had an iodine number of 23 and an acid number of 51. Thus the sultone contained a certain amount of unsaturated sulfonic acid. The product was further purified by rectification in a small rectifying column. Thereafter, it had an iodine number of 4 and an acid number of 5. For the preparation of sultone reaction products, not only the rectified product with an acid number of 5, but also the raw product with an acid number of 51 could be used with good success.

*Example 2*

224 gm. of technical grade n-hexadecene-1 were reacted with 62 gm. of $SO_3$ in the form of 5% $SO_3$-air mixture over the course of 75 minutes in the same apparatus as that described in Example 1, the temperature of the reaction mixture being maintained at 15-20° C. by cooling.

The raw reaction mixture was freed from excess olefin by two successive treatments in the thin-layer-evaporator at a jacket temperature of 120-130° C. and a pressure of 0.1 mm. Hg. Upon cooling, the product solidified. For further purification it was recrystallized from gasoline. 110 gm. of a $C_{16}$-sultone were obtained which had a melting point of 69° C., a saponification number of 179 (theoretical saponification number 184) and an acid number of 12.

*Example 3*

254 gm. of technical grade n-octadecene-1 were reacted with 58 gm. of $SO_3$ in the form of 5% $SO_3$-air mixture over the course of 90 minutes in the same apparatus as that described in Example 1. The temperature was maintained at 20-28° C. The reaction mixture became viscous in the course of the sulfonation reaction. Crystals began to separate after a short period of time.

After completion of the reaction, the reaction mixture was allowed to stand overnight for the purpose of complete crystallization. Thereafter, the crystals were separated on a vacuum filter and were washed with a small amount of cold petroleum ether. 213 gm. of crystallized product were obtained which still contained unsaturated components, but which was sufficiently pure for the preparation of sultone reaction products.

Example 4

236 gm. of technical grade tetradecene-1 were reacted with 67 gm. of sulfur trioxide in the form of a 10% SO₃-nitrogen mixture over the course of 68 minutes in the above-described apparatus. The temperature was maintained constant at +10° C. during the reaction period. After completion of the reaction, the mixture was allowed to stand 20 hours. Thereafter the crystals which formed during that time were separated on a vacuum filter and were washed with a small amount of petroleum ether. 199 gm. of a product were obtained which had the following characteristic values: saponification number 169; acid number 36; iodine number 32.3. The product was sufficiently pure for preparation of sultone reaction products.

Example 5

48 gm. of liquid SO₃ were added dropwise over a period of 75 minutes to 84 gm. of n-hexene-1, accompanied by cooling and vigorous stirring. The temperature of the reaction mixture was maintained at −10° to −20° C. After all of the SO₃ had been added, the mixture was subjected to vacuum distillation. 37 gm. of raw hexane sultone were obtained, which was purified by repeating the distillation.

Example 6

A solution of 80 gm. of SO₃ in 200 cc. of 1,2-dichloroethane was added dropwise over the course of 90 minutes at −30° C. to a solution of 90 gm. of n-butene-1 in 500 cc. of 1,2-dichloroethane, accompanied by stirring. Thereafter the reaction mixture was heated for 30 minutes at 80° C. in order to remove the unreacted butene. Subsequently, the dichloroethane was separated at 30° C. in an aspirator vacuum. The residue was distilled off under a vacuum of 0.03 mm. Hg. 81 gm. of raw butane sultone were obtained, which was further purified by repeating the distillation.

The above examples illustrate the process of the invention. While the above examples are illustrative of the principle of the invention, on a batch basis, it is obvious that the process may be performed in a continuous manner and the process is admirably suited for large scale continuous production. It will be readily apparent to those skilled in the art that the present invention is not limited to the specific embodiments, and that various changes and modifications may be made without departing from the spirit of the invention or the scope of the appended claims.

We claim:

1. A process for the production of a sultone which comprises the steps of reacting about one mol of an α-olefin having the formula

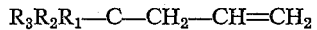

wherein $R_1$, $R_2$ and $R_3$ are selected from the group consisting of hydrogen and aliphatic hydrocarbon, said α-olefins having from 4 to 30 carbon atoms, with from 0.1 to 0.8 mol of sulfur trioxide at a temperature between about −30° C. and about 80° C. and recovering said sultone.

2. The process of claim 1 wherein from 0.2 to 0.7 mol of SO₃ are utilized per mol of said α-olefin.

3. A process for the production of a sultone which comprises the steps of reacting about one mol of an α-olefin having the formula

wherein $R_1$, $R_2$ and $R_3$ are selected from the group consisting of hydrogen and aliphatic hydrocarbon, said α-olefins having from 4 to 30 carbon atoms, with from 0.1 to 0.8 mol of sulfur trioxide as present in a sulfur trioxide sulfonation agent selected from the group consisting of a solution of SO₃ in liquid SO₂, a solution of SO₃ in dichloroethane, and mixtures of gaseous SO₃ and inert gases having an SO₃ content of from about 3 to about 15% by volume.

4. The process of claim 3 wherein said sulfur trioxide sulfonation agent is a mixture of gaseous SO₃ and air containing from about 3 to about 15% by volume of SO₃.

5. The process of claim 3 wherein said reaction is conducted at a temperature of from −10° C. to +40° C.

6. The process of claim 3 wherein said α-olefin contains from 10 to 20 carbon atoms in the molecule.

7. The process of claim 3 wherein the raw sulfonation product is subjected to aqueous hydrolysis and the hydroxyalkane sulfonic acid is subsequently heated at elevated temperatures to split off water and form said sultone.

8. The process of claim 3 wherein the recovery of the sultone is effected by means of crystallization.

9. The process of claim 3 wherein the recovery of the sultone is effected by extraction.

10. The process of claim 3 wherein the recovery of the sultone from the reaction mixture is effected by direct distillation in vacuo.

References Cited in the file of this patent
UNITED STATES PATENTS
2,810,746    Rueggeberg et al. _____ Oct. 27, 1957